United States Patent Office 3,489,074
Patented Jan. 13, 1970

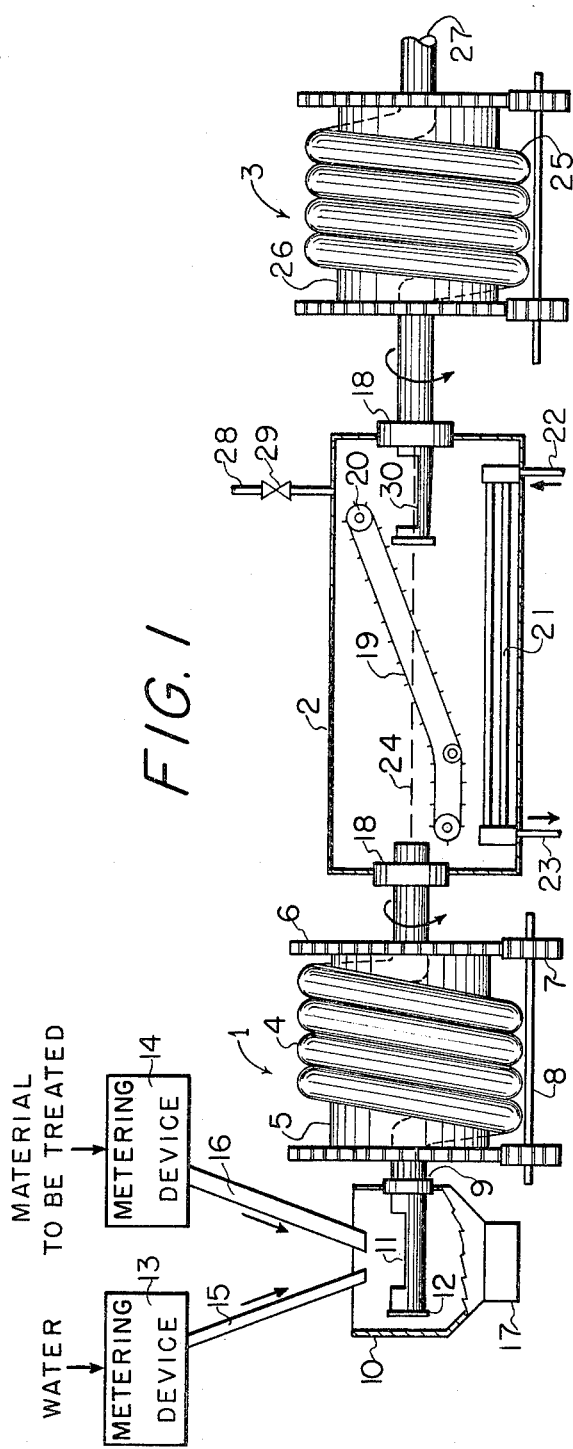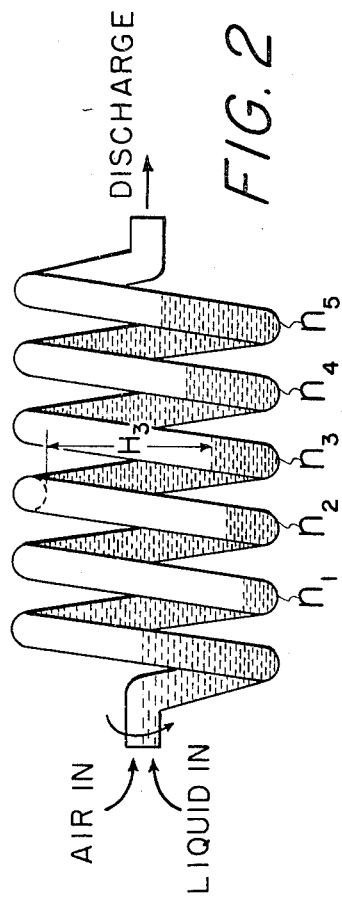

3,489,074
FOOD-TREATING DEVICE WITH HELICAL PUMPING SYSTEM
Daniel F. Farkas, Berkeley, and Melvin E. Lazar, Oakland, Calif., assignors to the United States of America as represented by the Secretary of Agriculture
Filed May 16, 1968, Ser. No. 729,626
Int. Cl. B65b 55/06; A23l 3/02
U.S. Cl. 99—249                                                         5 Claims

ABSTRACT OF THE DISCLOSURE

Device for treating solid materials—e.g., fruits, vegetables, grains, packaged foods, etc.—at pressures above or below atmospheric pressure, which includes a helical pumping system for conveying the objects into and out of the treatment zone whereby the integrity of the objects is preserved, even where they are of a delicate nature as is the case, for example, with berries, peach halves, foods packaged in plastic pouches, etc.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel apparatus for the treatment of solid materials—e.g., fruits, vegetables, grains, packaged foods, etc.—at pressures above or below atmospheric pressure. A special object of the invention is the provision of such apparatus which includes a coil or helical pumping system for conveying the objects into and out of the treatment zone. Further objects of the invention will be evident from the following description and the attached drawing, wherein:

FIG. 1 is view, partly in cross-section, of apparatus in accordance with the invention.

FIG. 2 is a diagram illustrating the operation of the helical pump.

Figure 3:
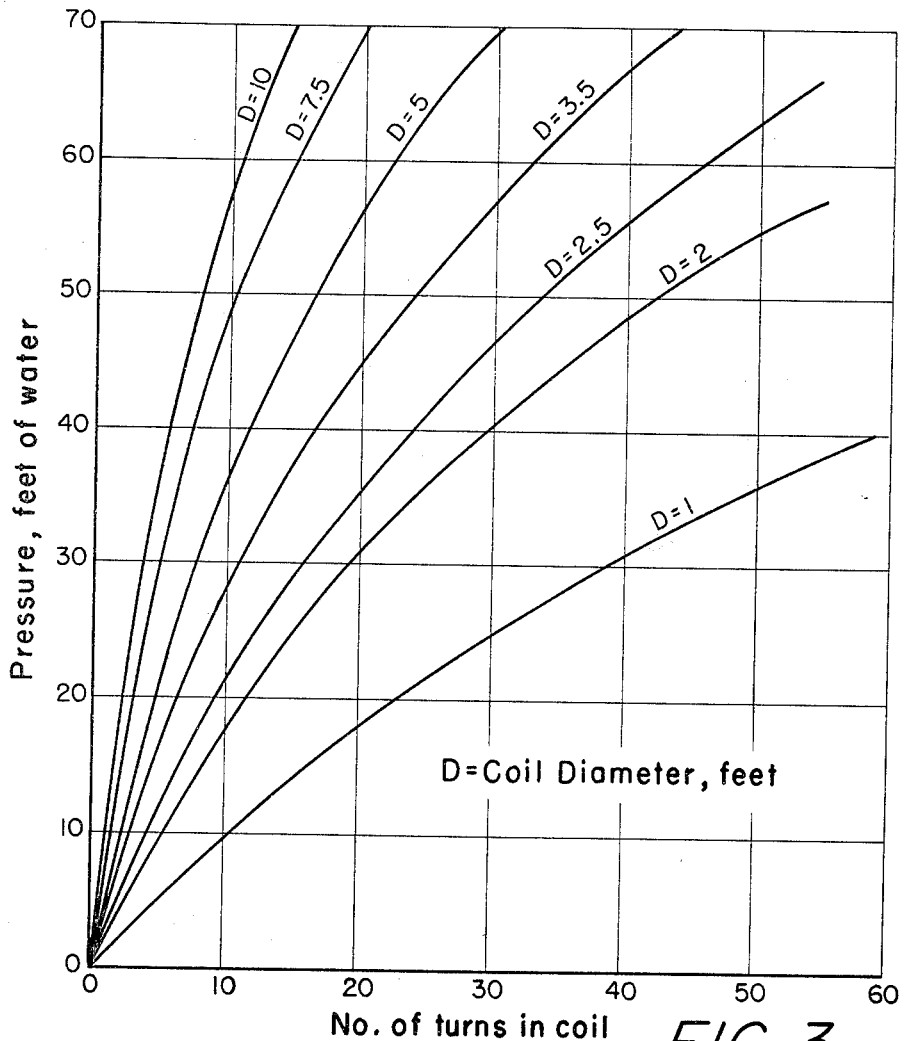
FIG. 3 is a graph illustrating how the parameters of the helical pumping system are selected for a desired pressure.

In the description, references to pressures are gauge pressures, unless otherwise specified.

In the following explanation, the application of the invention to pressure treatment sytems is emphasized. However, the invention is also applicable to systems operating at subatmospheric pressures, and such applications will be explained in a later portion of the description.

In the processing of various commodities it is conventional to include one or more treatments under pressure. Typical examples thereof are the cooking of potatoes or grains, the sterilizing of canned or otherwise packaged foods, etc. Where apparatus for pressure treatment is operated on a continuous basis, it is necessary to provide some means whereby the material can be conveyed into and out of the pressure zone without loss of pressure. Among the conventional devices for such purpose are pumps. However, pumps are primarily suitable for handling liquids or mixtures of liquids and small objects such as cereal grains. The handling of large and delicate objects such as plastic pouches of foods in pumps is out of the question. The use of tall columns of water—or barometric legs as they are usually called—is possible, but these are very bulky. For example, a pressure chamber operating at 10 p.s.i.g. would require two legs (one for feeding, one for discharge), each at least 23 feet tall. Pressure lock devices are available but have the disadvantages of involving complex and expensive mechanisms.

A primary object of the invention is the provision of apparatus by which the foregoing problem is obviated. The system of the invention is not only effective in conveying objects into and out of the pressure (or vacuum) zone but does so without harming the objects being conveyed, even where they are of a delicate nature as is the case with berries, peach slices, other fruits or vegetables, and food products packed in pouches or sacks of plastic, foil, or the like. Moreover, the system of the invention is relatively simple in construction, and much more compact than hydrostatic column devices.

Reference is now made to FIG. 1 which depicts a form of apparatus in accordance with the invention.

The device includes a helical feed pump generally designated as 1, a treatment chamber 2, and a helical discharge pump generally designated as 3.

The helical feed pump generally designated as 1 includes a coil 4 of tubing wound about drum 5. For simplifying the drawing, coil 4 is shown as containing a representative number of turns. In actual practice, the number of turns will depend on such factors as coil diameter, pressure conditions, etc., all as explained below. In similar manner, the number of turns shown in coil 25 and in the coil of FIG. 2 are also merely representative.

Fastened to the ends of drum 5 are sprockets 6 which mesh with gears 7 keyed on shaft 8. A suitable driving means such as a variable speed electric motor (not illustrated) is provided for rotation of shaft 8 whereby coil 4 is rotated as a unit in the direction indicated by the arrow.

The left-hand portion of coil 4 passes through bearing 9 into hopper 10. For receiving water and material to be treated, coil 4 is provided with a cut-out portion or feed inlet 11. The end of coil 4 is closed by cap 12.

Metering feeders 13 and 14 and conduits 15 and 16 are provided for delivering water and material at predetermined rates into coil 4 via inlet 11. Any excess material which does not enter the feed system can be collected from outlet 17 of hopper 10 and returned to feeder 14. It is obvious that delivery means 16 need not necessarily take the form of a simple conduit. For example, in handling packaged foods, this means would more preferably be a conveyor belt.

Since inlet 11 is part of coil 4, it will be in receiving position—facing up as shown in FIG. 1—once in each revolution of coil 4. The net result is that water and material are received into coil 4 in slugs. Moreover, the area of inlet 11 is such that each slug (water and material combined) has a volume of one-half that of a single turn of coil 4. The limitation of the volume of the slugs combined with the fact that each slug is separated by an equal volume of air (air enters coil 4 as inlet 11 rotates away from its upward position), means that as coil 4 rotates, these slugs form a series of hydrostatic columns and the total pressure developed is the sum of these columns. The situation which exists in coil 4 is depicted in FIG. 2. For example, $H_3$ represents the head developed in the third turn, $n_3$, of the coil. The total head developed is the sum of the heads or hydrostatic columns in the five turns $n_1$, $n_2$, $n_3$, $n_4$, and $n_5$. Since the rotation is continuous, it is obvious that when the coil turns 180°, the slug in turn $n_5$ will be discharged and as the rotation continues another 180°, the slugs will move one turn toward the discharge end and a new slug will enter from the feed end into turn $n_1$.

Returning now to FIG. 1, the material and water are fed by coil 4 through gas-tight bearing 18 into treatment chamber 2.

Chamber 2 is of pressure-resistant construction and includes a cleated conveyor belt 19 driven by rollers 20. These rollers are in turn rotated by any suitable means, for example, by shafts which protrude via gas-tight bearings to the outside of chamber 2. The driving means is co-ordinated with that of coil 4 so that material is carried on belt 19 at the same rate that it is conveyed through coil 4.

A heat-exchange unit 21 is provided for keeping the interior of chamber 2 at a pre-determined temperature. Steam, hot water, or the like is circulated through heat-exchange 21 via conduits 22 and 23. Typically, for sterilizing non-acid foods in plastic pouches, chamber 2 is maintained at about 240° F. corresponding to a pressure of 10 p.s.i.g.

Chamber 2 is also provided with conventional auxiliary equipment (not illustrated) including pressure gauge, outlet for excess air or other fixed gases, means for discharging condensate, etc.

The material entering chamber 2 from coil 4 is received on belt 19 and is conveyed thereby through the chamber and to coil 25 of helical discharge pump 3. Chamber 2 is filled with water to the level indicated by line 24 and during operation this level is maintained as water is fed in by feed pump 1 and discharged at the same rate by discharge pump 3. It may be noted at this point that although water is usually used as the carrier liquid in the system of the invention, one can use any other liquid. For example, the liquid may be a glyceride oil or fat where it comes into actual contact with the food surface—as in frying of potato pieces. Where the liquid is to be used as a heat-transfer medium—as in sterilization of canned foods—it can be any high-boiling liquid, edible or not, such as glycol, glycerine, silicone oil, hydrocarbon oil, etc. For such applications as impregnation of fruit slices the liquid may be a sugar syrup, fruit juice, a fruit juice concentrate, or the like.

Helical discharge pump 3 includes a coil 25 of tubing which is wound about drum 26 and which is rotated by a sprocket and gear arrangement exactly as is coil 4, and in time with the rotation of coil 4. Coil 25 is provided with an inlet 30 which functions like inlet 11 of coil 4 to take in slugs of water and material under treatment. The rotation of coil 25 operates as has been described in connection with coil 4 except that in this case the water and treated material are conveyed out of chamber 2 and delivered via open end 27 of coil 25. It is, of course, obvious that discharge pump 3 also acts as a seal in that it prevents loss of the pressure existing in chamber 2.

Chamber 2 is preferably equipped with a steam inlet pipe 28 and valve 29. With this equipment steam may be admitted to chamber 2 at the start of a run to bring the pressure up to a desired level. Also during operation, valve 29 may be controlled by a conventional pressure-sensing device to maintain a uniform pressure in chamber 2, that is, to smooth out any pulsating effects as individual slugs are pumped into the chamber by coil 4.

Coils 4 and 25 are generally formed from tubing having a round or circular cross-section. However, this may be elliptical, rectangular, or of other configuration best suited to handling particular materials. Also, the coils may be jacketed or otherwise provided with means for heating or cooling the material which passes though the coils.

Reference is now made to FIG. 3 which illustrates how the parameters of the helical pumping system are selected to attain a desired pressure. In the figure, seven separate curves are shown, each being applicable to a particular coil diameter D, measured in feet. Coil diameter refers to this dimension of the coil as a unit, and is not to be confused with diameter of the tubing which makes up the coil.

The figure illustrates, for example, that if one selects a coil diameter of one foot, 40 turns would be required to generate a pressure, or head, of 30 ft. of water. On the other hand, the same pressure will be generated with only eight turns where the coil diameter is 5 ft.

It is significant to note that neither the speed of rotation of the coil nor the diameter of the tubing which makes up the coil play any role in pressure generation. These items, however, do affect the throughput of the system. Naturally, the larger the diameter of the tubing and the higher the speed of rotation the greater will be the throughput of the system. It is also obvious that the diameter of the tubing needs to be large enough for easy passage of the particular material which is under treatment.

In setting up the total apparatus, one uses a feed coil and a discharge coil each of which provides the same pressure. For example, if treating chamber 2 is to operate at $x$ lbs. pressure, each of the coils 4 and 25 would be selected with such parameters as to be capable of providing a pressure of $x$ lbs., even though in the total system only coil 4 would be used in a capacity to generate pressure, whereas coil 25 would resist the pressure (i.e., prevent loss of pressure at the discharge end of the system).

For application to parameters not shown in FIG. 3, one may apply the formula:

$$P_n = R\left[n - \sum_1^n \cos\frac{180° \cdot P_o}{P_o + P_{n-1}}\right]$$

wherein $P_n$ = pressure generated by the coil, in feet of liquid
$R$ = radius of the coil, in feet
$n$ = number of turns in the coil
$P_o$ = pressure (absolute) at feed end of coil, in feet of liquid
$P_{n-1}$ = pressure, in feet of liquid, generated in the $n-1$ turn. This value is determined when the various values for $P_1, P_2, P_3 \ldots$ are successively determined to arrive at the summation.

The apparatus of the invention can be applied to all kinds of processes which involve a treatment of material at pressures above or below atmospheric. Typical of treatments under super-atmospheric pressure are cooking or blanching of foods, sterilizing of packaged foods, etc. Typical of treatments under sub-atmospheric pressure are: impregnation of fruit slices with sugar syrups or other liquids containing sweeteners, flavoring agents, preservatives, etc.; degassing of fruit slices or other foods prior to packaging; impregnation of beans, cereals, or other foods with solutions containing preservatives, tenderizing agents, etc. It is evident that where the treatment involves contacting of foods with syrups or other liquids as noted above, such liquid would be used as the carrier instead of plain water as described above in connection with the description of FIG. 1.

Figure 4:
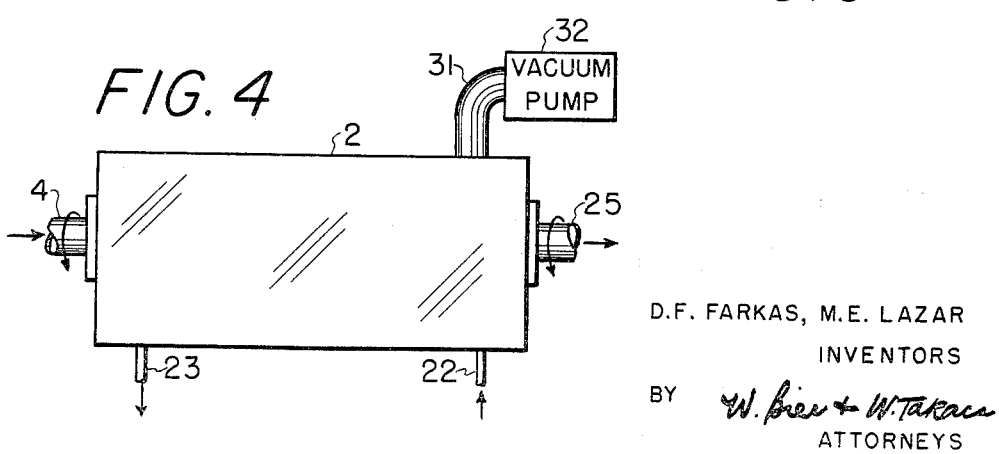
FIG. 4 is a fragmentary view illustrating the apparatus of FIG. 1 as modified for vacuum operation.

Reference is now made to FIG. 4 which depicts a modification of the invention for operation at sub-atmospheric pressure. The apparatus is as shown in FIG. 1 with this exception: Steam inlet 28 and valve 29 are replaced by a conduit 31 which is connected to a conventional vacuum pump 32. In starting a run, vacuum pump 32 is operated to reduce the pressure in chamber 2 to the desired level. During the run, the vacuum pump is operated as necessary to scavenge air (and any other gases which enter chamber 2) and keep the vacuum at the selected level. In such vacuum operation, coils 4 and 25 are constructed and function the same as described in connection with the modification of FIG. 1. Also, in selecting the parameters of the coils, the same principles apply. For example, if chamber 2 is to be operated at one-half atmosphere, one would select the parameters of coils 4 and 25 so that each would have the capability of generating one-half atmosphere or, expressed in other terms, a head of 17 ft. of water. It is also evident that in operating in a vacuum system, coil 4 would operate to resist pressure whereas coil 25 would operate in a pressure-generating capacity.

Having thus described the invention, what is claimed is:
1. Apparatus for sterilizing foods encased in sealed containers which comprises
 (I) a sterilizing chamber,
 (II) means for maintaining a superatmospheric pressure in the sterilizing chamber,
 (III) means for maintaining a temperature of at least 212° F. in the sterilizing chamber,
 (IV) means for feeding the sealed containers into the sterilizing chamber, said feeding means including
  (a) a coil of tubing wound about an axis, the coil having a first end open to the atmosphere and a second end communicating with the sterilizing chamber,
  (b) means for rotating the coil about its axis, and
  (c) means for introducing slugs consisting of sealed containers and water into the first end of the coil, at the rate of one slug per revolution of the coil, each slug having a volume of about one-half the volume of a single turn of the coil,
 (V) means for discharging sterilized containers out of the sterilizing chamber, said discharging means including
  (a) a coil of tubing wound about an axis, the coil having a first end communicating with the sterilizing chamber, and a second end open to the atmosphere,
  (b) means for rotating the coil about its axis,
  (c) means for introducing slugs consisting of sealed containers and water into the first end of the coil, at the rate of one slug per revolution of the coil, each slug having a volume of about one-half the volume of a single turn of the coil.
2. Apparatus for treating foods which comprises, in combination
 (I) a treating chamber,
 (II) means for feeding solid food material into the treating chamber, said feeding means including
  (a) a coil of tubing wound about an axis, the coil having a first end open to the atmosphere and a second end communicating with the treating chamber,
  (b) means for rotating the coil about its axis, and
  (c) means for introducing slugs consisting of solid food material and a carrier liquid into the first end of the coil, at the rate of one slug per revolution of the coil, each slug having a volume of about one-half the volume of a single turn of the coil,
 (III) means for discharging treated solid food material out of the treating chamber, said discharging means including
  (a) a coil of tubing wound about an axis, the coil having a first end communicating with the treating chamber, and a second end open to the atmosphere,
  (b) means for rotating the coil about its axis, and
  (c) means for introducing slugs consisting of treated solid food material and carrier liquid into the first end of the tube, at the rate of one slug per revolution of the coil, each slug having a volume of about one-half the volume of a single turn of the coil.
3. The apparatus of claim 2 which includes means for heating the treating chamber.
4. The apparatus of claim 2 which includes means for pressurizing the treating chamber.
5. The apparatus of claim 2 which includes means for reducing the pressure in the treating chamber.

References Cited

UNITED STATES PATENTS

| 1,114,603 | 10/1914 | Giger | 103—86 |
| 1,859,147 | 5/1932 | Kuczynski | 99—249 |
| 2,507,797 | 5/1950 | Martin | 99—239 XR |
| 2,549,216 | 4/1951 | Martin | 99—249 XR |
| 2,590,323 | 3/1952 | Janser et al. | 99—253 XR |
| 3,092,503 | 6/1963 | Gray | 99—249 |

FOREIGN PATENTS 442,863 4/1927 Germany.

WALTER A. SCHEEL, Primary Examiner

ARTHUR O. HENDERSON, Assistant Examiner

U.S. Cl. X.R.

103—1, 86